Aug. 20, 1963
N. J. APPLETON
3,101,001
DIGITAL FORCE TRANSDUCER
Filed May 4, 1959
2 Sheets-Sheet 1
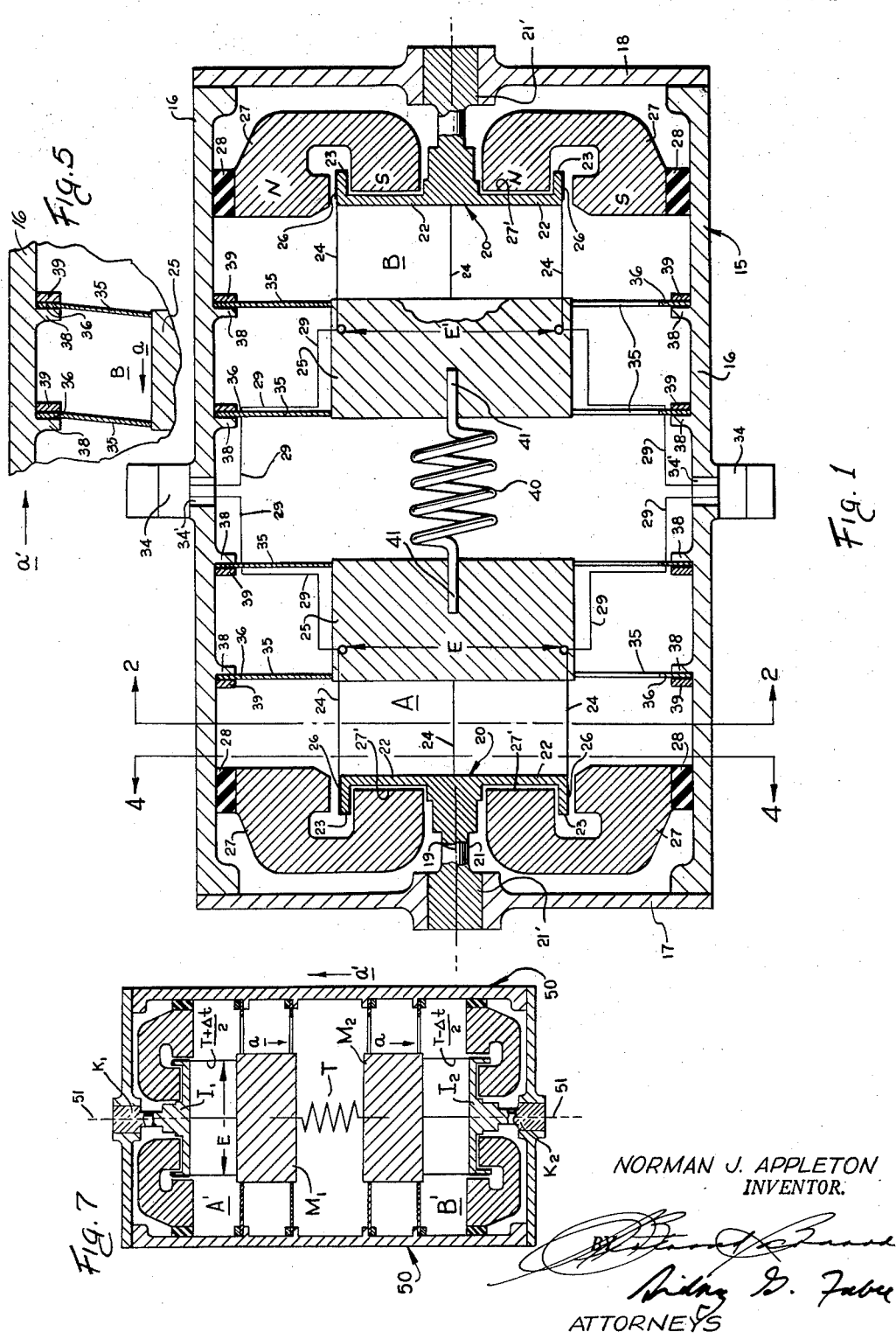
NORMAN J. APPLETON
INVENTOR.
ATTORNEYS Aug. 20, 1963
N. J. APPLETON
3,101,001
DIGITAL FORCE TRANSDUCER
Filed May 4, 1959
2 Sheets-Sheet 2
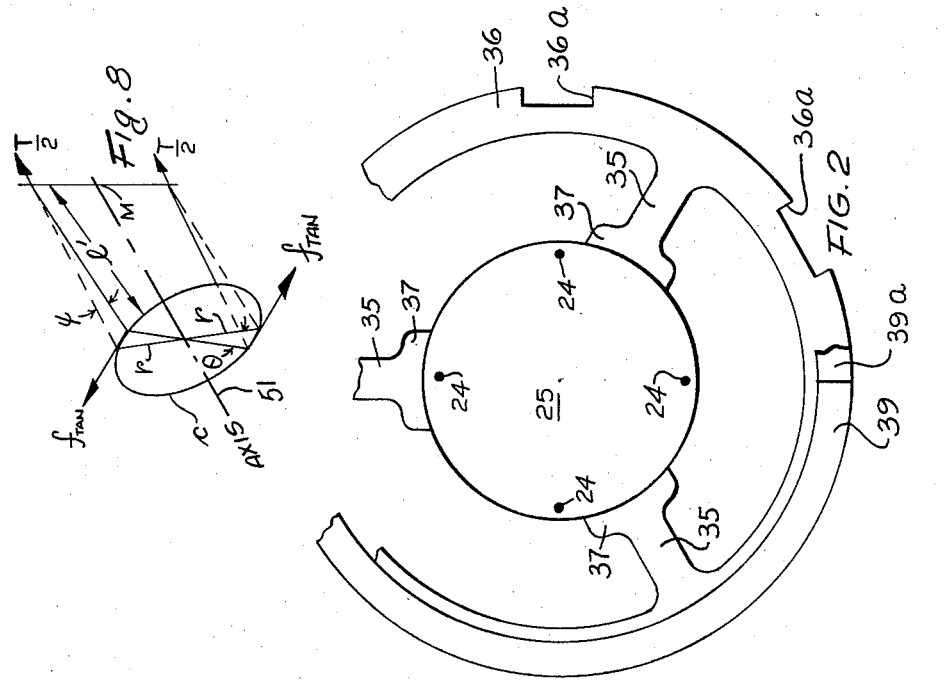
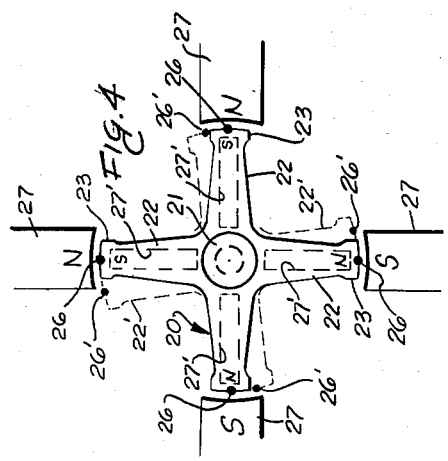
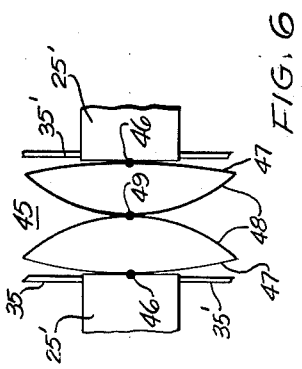
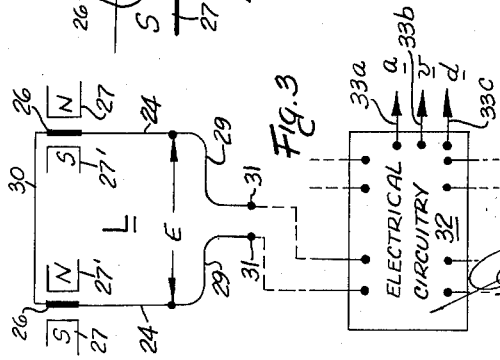
NORMAN J. APPLETON
INVENTOR.
ATTORNEYS United States Patent Office
3,101,001
Patented Aug. 20, 1963

3,101,001
DIGITAL FORCE TRANSDUCER
Norman J. Appleton, Plainview, N.Y., assignor to General Precision, Inc., a corporation of Delaware
Filed May 4, 1959, Ser. No. 810,830
13 Claims. (Cl. 73—503)

This invention relates generally to force transducers for translating applied force into proportional frequency output that is compatible with digital computation; and more particularly relates to such transducers for precisely measuring acceleration and determining velocity along a single-axis, as an integrating accelerometer.

The invention transducer incorporates an electromechanical system subject to torsional oscillation. Applied force controls the oscillation frequency. The change of frequency of the system is proportional to the applied force over a relatively wide range. The electromechanical system incorporates a plurality of parallel strings maintained under tension in conjunction with a force translating body oriented in the sensitive axis direction. Applied axial pressures, forces or accelerations cause corresponding changes in the plural string tension, to proportionally affect the oscillation frequency.

A measure of the oscillation frequency compared to the base or natural frequency of the torsional system hereof, affords a precise reading of the pressure, force or acceleration to which the transducer is subjected in its sensing axial direction. By counting the algebraic sum of the cycles (or pulses) of such difference frequency over a base time period, one directly obtains precise measurements. This latter determination is for example effected when the transducer is used as an integrating accelerometer. Electromagnetic means are provided in the transducer to both establish its natural torsional oscillation, and sense its actual oscillating frequencies.

Although the physical form and mode of operation of the invention transducer are markedly different from that of a vibrating string accelerometer, their system equations are analagous. The transducer hereof is markedly superior to the vibrating string instrument in many important aspects;

(1) Its practical linearity range of operation is substantially greater, for any given sensitivity figure.

(2) The stresses on internal critical elements are substantially lower, affording longer term stability.

(3) Its functional parts can be made smaller in size and weight for equivalent applications, rendering it substantially immune to disturbances due to abrupt directional changes.

(4) Due to the torsional mode of operation of the vibration member, the unit is far less sensitive to undeviced vibrations and accelerations along any axis except the sensitive axis. This feature is of vital importance in applications, such as guided missiles.

The transducers of the present invention can be used in a broad range of applications. Their use in inertial navigation systems as single-axis accelerometer components, is clear. Their ruggedness, light-weight, stability of operation, accuracy and relatively wide range of linearity, make them particularly useful in jet aircraft and missile guidance applications. With minor variations, the basic force transducer hereof can be used to convert any analogue quantity which may be translated either directly or indirectly into a force, to a corresponding frequency output. Such frequency output is readily related to digital computation, whereby the transducer is used as an analogue to digital converter. The subject devices are also excellent pressure transducers. With a pressure bellows incorporated as the force translating body, it varies the plural string tension and effects a frequency output proportional to pressures applied to the bellows.

A primary object of the present invention is to provide a novel force transducer incorporating a torsional member coupled with a plurality of strings under tension, translating applied forces to corresponding frequency outputs.

Another object of the present invention is to provide a novel force transducer usable as a precise, light-weight, small size integrating accelerometer.

A further object is to provide a novel accelerometer of extended linearity range, and substantially improved figure of merit, namely linearity to sensitivity ratio.

Still another object is to provide a novel force transducer with substantially reduced stresses on its internal components, having greatly improved stability and useful life.

Still a further object is to provide a novel single-axis integrating accelerometer that is compact, sensitive and accurate, and relatively immune to cross-accelerations and vibrations along any axis except the sensitive axis.

These and other objects will become more apparent from the following description of an exemplary embodiment thereof illustrated in the drawings, in which:

FIGURE 1 is an enlarged longitudinal cross-sectional view through the exemplary force transducer in the form of an accelerometer, oriented horizontally.

FIGURE 2 is a sectional view transversely across the transducer taken along the line 2—2 of FIGURE 1, in the direction of the arrows.

FIGURE 3 is a schematic electrical diagram of a section of a system utilizing the invention transducer.

FIGURE 4 is a sectional view transversely across the transducer, taken along the line 4—4 of FIGURE 1, in the direction of the arrows.

FIGURE 5 is a portion of FIGURE 1, illustrating the action of the transducer.

FIGURE 6 is an elevational view of a modified portion of the transducer.

FIGURE 7 is a diagrammatic showing of the examplary transducer, in vertical orientation.

FIGURE 8 is an analytical diagram of a torsional oscillatory section of the transducer.

The exemplary force transducer 15 is an accelerometer. Other applications and embodiments of this invention are contemplated. The transducer 15 comprises two independent symmetrical torsional oscillating systems A and B contained in an hermetically sealed housing. The housing is composed of cylindrical shell 16, and end plates 17, 18 suitably secured thereto. The interior of device 15 is preferably though not necessarily maintained as a vacuum. The oscillating systems A and B are arranged in mirror symmetry along common longitudinal axis 19. Each system A, B, has a four spoke torsional member 20 axially supported by torsion shafts or bars 21, 21 fixedly mounted in respective end plates 17, 18 along axis 19, in an enlarged cylindrical section 21', 21' of each torsion shaft being pressed into or otherwise attached to a hub integral with each of the end plates 17, 18. Torsion shafts 21, 21 may be tubular or solid.

At the outer end of each spoke 22 of members 20 is incorporated a rectangular shaped section 23. Each member 20, in conjunction with its radially disposed sections 23, and its associated torque bar 21, constitutes an effective torsional spring mass system oscillatory about axis 19 with a predetermined moment of inertia (I). The frequency of oscillation of each torsional member 20 is controlled by the tension in a plurality of wires 24, 24 attached thereto, in a manner hereinafter described. The torque bar (or tube) 21 serves as a torsional spring, with a fixed torsional spring constant (K) in connection with the said moment of inertia (I) of member 20. Members 20 and torque shafts 21 are fabricated of steel or other suitable material.

A number of wires 24 each having one end firmly connected to or imbedded in the outer surface of a spoke 22 of members 20, 20 and the other end imbedded in or otherwise secured to an associated proof-mass 25, serves as a tension system. Wires 24 are made sufficiently thin to effectively operate as strings. Wires 24 may be metallic, of electrically conducting material, or may be quartz. When strings 24 are non-conductors, they are suitably plated with conductive material for electrical circuitry involved therewith. The tension in wires or strings 24, which is varied by the acceleration of the unit 15, controls the frequency of oscillation of the torsion member 20, as will be set forth.

Four wires 24 are illustrated in each, uniformly arranged about their respective inertial members 20. It is to be understood that as few as two wires (24) may be used in each oscillatory section A and B. It is desirable, though not necessary, that each system A and B be identically constructed, in mirror symmetry for balanced performance. Three or more wires 24 may also be used in uniform array about each member 20, with like number of spokes. Also members 20 may assume other shapes, as for example, discs. At least two wires 24 for each member 20 are made conductive of electrical signals. Each set of the wires 24 for each system A, B are preferably identical in a given structure, to maintain balance and symmetry.

The wires 24 terminate in a conductive strip or film bar 26 at their respective spoke ends 23. Strips 26 are electrically insulated with respect to members 20, and are arranged within respective permanent magnetic fields for electromagnetic action. A C-shaped permanent magnet 27 is mounted at each spoke 22 region, with inner portions 27' forming gaps subtending the spoke end units 23 and associated conductive strips 26. The magnets 27 are electrically isolated from casing 16, being supported thereon with insulation blocks 28.

It is noted that opposed strips 26 are impressed with oppositely directed magnetic fields, in order that their electromagnetic actions be additive in a common signal circuit. Such common circuit for example, comprises the 180° opposed pairs of wires 24, 24 in connection with respective signal terminals at E, E'; (FIGURE 1). The signal loops (L) formed by the wire pairs and the opposed strips 24, are electrically completed by respective return leads 30 carried by members 20, 20 (not shown in FIGURE 1, indicated in FIGURE 3). Where four wires 24 are used in each system A, B, as in the exemplary embodiment, two independent signal loops (L), in quadrature, may be connected up in each system for electrical purposes.

FIGURE 3 schematically illustrates the electrical composition of a single signal loop L composed of two opposed conductive wires 24, 24 and their associated conductive strips 26, 26 in electrical series through conductive link 30 at member 20. Wires 24, 24 of a loop L are connected externally of transducer 15 through wire leads 29, 29. The bars 26, 26 coact with the permanent magnetic fields of magnets 27, 27 suitably oriented as set forth hereinabove. The wire leads 29, 29 pass through apertures 34', 34' in casing 16, and terminate for external connection (31, 31) in connectors 34, 34 in a conventional manner.

Torsional oscillation of inertia members 20, 20 with their wires 24, about the sensing or longitudinal axis 19 of transducer 15, effects relative motion of strips 26, to e.g. 26', across the fields of magnets 27; as indicated in dashed lines at 22' in FIGURE 4. A corresponding electrical signal is thereupon induced into each signal loop L, and appears at terminals 31 as signal E. Conversely, an external signal voltage applied to loop L terminals 31, results in a current through strips 26, 26 that reacts motively with the magnetic fields. Electromagnetic excitation, sensing and feedback circuitry, diagrammatically indicated at 32, is connected to the respective signal loops L incorporated in torsional systems A and B. The electrical circuitry 32 is utilized to excite these systems A, B, supply losses, sense their frequencies of oscillation and, in general, convert the mechanical systems A and B into oscillators. The action of strips 26, 26 in the fields of magnets 27, 27 is comparable to that of an oscillating motor. Electronic circuits to limit the amplitude of oscillation of systems A, B are preferably incorporated, as are means to damp the proof-masses 25, 25.

The proof-masses 25, 25 are restrained along the sensing axis (19) only by the equilibrium of the change in the tension in string (24), and the force F equals to $Ma$, where M is the mass of each unit 25 and $a$ its applied axial acceleration, with respect to inertial space. Each proof mass 25 is supported rigidly against transverse or cross-acceleration and torsional forces by cross-acceleration supports composed of ribs 25 extending radially inwardly from ring 36. The base 37 of each rib 35 extends into the respective proof mass 25, for firm securement therewith. The supports 35, 36 are integral ring-rib units of tough flexible spring material. The proof masses 25 are held substantially fixed along their longitudinal axis by the wires 24, 24 attached to each proof mass. The only longitudinal movement of each proof mass 25 is that allowed by the elongation of the wires 24, 24, which accompanies the tension loads applied to the wires. Such displacement or longitudinal movement is in practice, negligible, due to the small loads applied, as contrasted with the combined longitudinal tensile strength of the four strips (24).

The cross-acceleration supports 35, 36 provide a high degree of rigidity in all directions except to the active (longitudinal) axis 19, affording negligible restraint to proof masses 25, 25 along this sensing axis (19), the masses being actually restrained by the wires 24, 24. The outer rim of each support ring 36 is secured to the cylindrical casing 16 as seen in FIGURE 1. Rings 36 abut corresponding radial bosses 38 projecting inward from casing 16. The outer circumference of each support ring 36 has a plurality of radially positioned slots 36a of substantially rectangular contour, to clear the radial bosses 38 and blocks 28 when the support rings 36 are inserted into the housing 16. Retaining rings 39 press against support rings 36 to firmly lock them in position in respective spaced planes perpendicular to axis 19. The retaining rings 39, 39a are split into two or more sections as shown in FIGURE 2, to enable them to be inserted into the housing 16 in the position shown in FIGURE 1. Proof masses 25 are accordingly supported thereby in predetermined longitudinal position in transducer 15, and in accurate coaxial relation with axis 19 thereof.

The proof masses 25 are shown in their neutral static positions in FIGURE 1. A biasing spring 40 is arranged centrally of transducer 15, between proof masses 25, 25. The ends 41 of spring 40 are respectively anchored in opposed proof masses 25, 25. Biasing spring 40 provides a constant axial bias tension T to both proof masses 25. The individual tension on each wire or string 24 equals $(T \div n)$ where $n$ is the number of strings in each system A, B; four, in unit 15.

The cross-acceleration supports 35, 36, provide torsional rigidity to proof masses 25 about the active axis. 19. An applied acceleration force along axis 19, such as that due to acceleration $a$ upon mass 25 of system B, to the left as indicated in FIGURE 5, increases the tension in the strings 24 of system B, the mass 25 being held substantially stationary, with respect to casing 16 as illustrated. The displacement of mass 25 in FIGURE 5 is shown greatly exaggerated for illustrative purposes. The ribs 35, 35 secured to mass 25 yield to permit its slight movement solely along the axis 19. A corresponding slight shift of mass 25 occurs to the right for a force applied to it in that direction. In such acceleration of mass 25 to the right in system B, the tension of its strings 24 would decrease. As the strings are set up with an initial tension, the reduction in tension still leaves the strings under tension. A differential or change in the base tension $(T \div n)$ on each string results from the acceleration, the change in tension being equal to $\pm(\Delta t \div n)$, its sense dependent on direction.

As an external force or acceleration is applied to the transducer 15 (and vehicle) as a unit, its component $a'$ along the sensing axis (19) produces an equal but opposite acceleration $a$ upon and an increase in tension in the wires 24, 24 in the manner hereinabove described, the proof masses 25 being held substantially stationary. The change in tension of both sets of wires 24, 24 is generally equal, the change in tension increasing or decreasing depending upon the direction of the accelerating force $a$. However, due to the mirror-symmetrical arrangement of the torsional oscillatory systems A and B, one mass 25 increases the base tension $(T)$ by $\Delta t$ on its set strings 24, while the other decreases such base tension $(T)$ also by $\Delta t$ on the other string set. The natural oscillation frequency $(f_0)$ of each matched system A and B is thereby altered.

In practice a particular transducer (15) has a known natural torsional oscillation $(f_0)$ for each balanced system A, B. The electrical circuitry 32 is arranged to apply a suitable signal into at least one signal loop (L) of each system A and B, at the base frequency $f_0$. The systems A and B are thereby set into and maintained in their natural frequency of torsional oscillation, with masses 25 unmoved in their neutral positions shown in FIGURE 1 when the acceleration $a$ is zero. The inertial members 20 oscillate about longitudinal axis 19 with their torsion shafts 21; and strings 24 under individual tension $(T \div n)$ due to coiled tension spring 40 are involved with members 20 in the oscillations, as will now be understood by those skilled in the art.

As masses 25 are supported rigidly against torsional displacement by cross-acceleration supports 35, 36 they are not involved directly in the base or zero acceleration torsional oscillations of systems A and B. The predetermined axial (19) tension (T) is thereby maintained as a constant across proof masses 25 by tension spring 40 during the system torsional oscillations. Further, since both masses 25, 25 are relatively stationary when accelerated, the distance between them is maintained, and the tension $(T \div n)$ on each string is varied by a portion of the force of acceleration imposed on the unit 15, throughout the operating range of the transducer.

The transducer 15 is accelerated to the left as per $a$ in FIGURE 5, the tension on each string 24 of system A (at the left of FIGURE 1) is reduced correspondingly by $(\Delta t \div n)$, and the tension on each string 24 of system B (on the right), increased by $(\Delta t \div n)$. The oscillation frequencies, in such case, become $(f_0 - \Delta f_1)$ for system A and $(f_0 + \Delta f_2)$ for system B. Within the linearity range of operation of balanced transducer 15 the values $\Delta f_1$ and $\Delta f_2$ are substantially equal. When the direction of acceleration $a$ reverses from that shown in FIGURE 5, the system A frequency is increased to $(f_0 + \Delta f_1)$, and that of system B reduced to $(f_0 - \Delta f_2)$.

The oscillations executed by each inertial member 20 directly produces electrical signals through the electromagnetic action of its strips 26 in their magnet 27 fields, as aforesaid. The electrical circuitry 32 measures the respective signals $e$ and their frequencies $(f_0 \pm \Delta f_1)$ and $(f_0 \mp \Delta f_2)$. Accelerations $a$ applied, produce difference frequencies $(\Delta f)$ between systems A and B, proportional thereto. Such overall difference frequency $\Delta f$ is represented by the net difference, namely $(\Delta f_1 + \Delta f_2)$, and is readily determined electrically through unit 32.

The acceleration $a'$ exerted at any instant upon transducer 15 along axis 19, is directly and precisely measured in a given unit 15 by the determination of the frequencies. A particular transducer 15 has a fixed base or natural frequency $(f_0)$ corresponding to zero acceleration; and a linear or pre-calibrated frequency-to-acceleration $(a)$ relationship. In the linear range of unit 15 a proportional relation exists between the net difference frequency $(\Delta f_1 + \Delta f_2)$ and the applied acceleration $(a)$. The circuit 32 accordingly is arranged with an output signal at 33$a$ corresponding to acceleration $a$.

Also of significance is the fact that the sense of the frequency changes in A and B is directly related to the direction of the accelerations $a$. Thus when system A, (at the left of FIGURE 1) decreases in frequency from its base $f_0$, the applied acceleration is from right to left in the transducer 15; and when the frequency of system A increases, the acceleration is in the axial (19) direction from left to right. Thus a given orientation of transducer 15 in a vehicle or device related to predetermined electric phasing of circuitry 32 herewith, establishes the sense of the applied forces and accelerations upon unit 15 (and the vehicle) in the unit's sensing direction.

The velocity at any instant of the vehicle and transducer (15), in its sensing axis direction, is the (integral) of the accelerations. Thus the velocity is directly determined by summing or totalling the number of cycles (or pulses) of the difference frequency $(\Delta f)$ generated over a time base. This integration or summation is readily performed by known circuitry in unit 32, to derive the velocity $v$ of transducer 15 along axis 19 at any given instant. Output lead 33$b$ provides a signal corresponding to velocity $v$.

It is to be noted that as the accelerations $(a)$ change direction, and the respective oscillatory systems A and B respond, the reversed frequency differences are algebraically integrated by circuit 32. Further integration by circuit 32, in a conventional manner, results in the determination of distance $d$ traversed in the base period along the sensing axis 19. The distance $d$ is represented by an output signal through lead 33$c$. A platform of three mutually perpendicular transducers such as 15 derives the acceleration components to establish the actual acceleration velocity and distance in the direction of flight.

FIGURE 6 illustrates the use of a spring array 45 to establish the base tension T in systems A, B in place of spring 40 shown in FIGURE 1. The spring array 45 is secured between proof masses 25', 25' at regions 46, 46. Masses 25' are supported in the transducer by cross-acceleration supports 35'. The spring array 45 is composed of two symmetrical sections, each made up of arcuate metal spring members 47, 48 joined at their outer edges. The members 47, 48 may be leaf springs or spherical segments. The members 48 are joined centrally at 49. The spring array 45 is arranged to create a predetermined tension T in the respective string sets associated with proof masses 25' in the manner described for tension spring 40 hereinabove. Other equivalent balanced tensioning means may be employed.

The exemplary transducer 15 has two mirror-symmetrical balanced torsional oscillatory systems (A, B). Such arrangement provides optimum overall signal output, sensitivity and range of linearity. However, systems A and B need not be balanced; or only a single sub-system corresponding to A or B may be employed, with corresponding reduced performance characteristics. The generalized analysis that follows is based on a transducer with two symmetrical balanced torsional systems, corresponding to A and B of FIGURE 1.

FIGURE 7 is a diagrammatic representation of a balanced transducer 50 oriented with its sensing axis 51 in the vertical direction. Its upper oscillatory torsional system A' is symmetrical with lower one B', as in unit 15. A constant tension bias spring (T) connects systems A', B'. The torsional systems A' and B' of unit 50 are constructed similarly to A and B of transducer 15 except for the use of two or four strings per side, and are not detailed further. The effect of the earth's acceleration due to gravity, $g$, in the vertical direction is integrated in the operation and associated circuitry of vertical transducer 50. The analysis herein accounts for the operational accelerations $a'$ in the vertical direction on transducer 50, resulting in accelerations $a$ on proof masses $M_1$, $M_2$ in the reverse direction, as indicated.

The base tension on each string of transducer 50 depicted in FIGURE 7 is $(T \div 2)$. The incremental tension $(\Delta t)$ exerted by each proof mass $M_1$, $M_2$ of mass $(M)$ is $M \cdot a$, where $a$ is the acceleration. In the two upper strings of $(A')$, the resultant tension herein is $$(T + \Delta t) \div 2$$

in the lower strings (of $B'$), $(T - \Delta t) \div 2$. These correspondingly are $(T \pm Ma) \div 2$, the sign depending upon the direction of the acceleration for either side.

The effective moment of inertia of the end torsional members (together with their respective torque shafts, corresponding to 21, 21' of unit 15), are designated $I_1$ and $I_2$. The respective torque shafts (or tubes) act as torsional springs connected to inertias $I_1$, $I_2$ with fixed torsional spring constants $k_1$, $k_2$. Also, under zero acceleration, the wire pairs connected to the inertial members $I_1$, $I_2$ are under tension $(T \div 2)$ and act thereon as a torsional spring. These wires are made thin enough to be considered as strings, and made to approximate ideal strings by making the ratio ($l$ I string) large, where $l$ is the length of each string.

The torsional spring constants ($k_a$, $k_b$) of the string sets for small angular displacements $\theta$, i.e. rotations of $A'$ and $B'$, at rotational frequencies well below the transverse natural frequency of a string of length $2l$, is derived as follows. Reference is made to FIGURE 8 wherein the circle $c$ represents the path of the two string ends secured with its inertia member at radius $r$ from the axis (51) of the torsional oscillations. The string length $l$ is that between the inertial member and the proof mass $(M)$.

The strings execute an angle $\psi$ while the inertia member rotates by $\theta$ degrees. For small angles herein involved, $\theta r = \psi l$ and $\psi = r\theta \div l$. The tangential force $$f_{\tan} \text{ equals } \frac{T}{2} \sin \psi$$

and for small deflections $$f_{\tan} = \frac{T}{2} \cdot \frac{r\theta}{l}$$

The torque exerted on the inertial members equals $2r \cdot f_{\tan}$ or $Tr^2\theta \div l$. The torsional spring constants $k_a$, $k_b$ equal this torque divided by $\theta$. Hence $k_a = k_b = (T \cdot r^2 \div l)$. For an acceleration $a$, with $\Delta t = M \cdot a$, each string's tension $= (T \pm Ma) \div 2$, as shown hereinabove. The torsional spring factor under such condition, thereupon is $$(T \pm Ma) r^2 \div l$$

The base or natural torsional frequency $f_0$ of systems $A'$ and $B'$ can be shown to equal $\sqrt{C_1(C_2 + T)}$, where $$C_1 = \frac{r^2}{4\pi^2 I l}$$

and $$C_2 = \frac{k_0 l}{r^2}, k_0 \text{ being a constant}$$

constant. Hence $f_0^2 = C_1(C_2 + T)$ at zero acceleration. An acceleration causes the base frequency $f_0$ of each system $A'$, $B'$ to change as follows:

$$(f_0 + \Delta f_1)^2 = C_1(C_2 + T + \Delta t)$$

$$(f_0 - \Delta f_2)^2 = C_1(C_2 + T - \Delta t)$$

Where the difference frequencies $\Delta f$ are small compared with base frequency $f_0$, then:

$$\frac{f_0}{C_1}(\Delta f_1 + \Delta f_2) = \Delta t = M \cdot a$$

With $f_0$ and $M$ in a given system being constants, then:

$$(\Delta f_1 + \Delta f_2) = A_0 \cdot a$$

where $$A_0 = \frac{C_1 M}{f_0}$$

Therefore $\Delta f = a$.

In the operational linearity range of the invention transducers, we thus note that the net differential frequency $(\Delta f)$ between balanced systems $A'$, $B'$, is proportional to the applied acceleration $a$. This relation is for small torsional oscillation angles $\theta$, relatively long, thin strings $l$, with their transverse natural frequency substantially higher than the torsional oscillation frequencies, and where the differential frequency $(\Delta f)$ is small compared with the natural oscillation frequency $(f_0)$. Also, the natural transverse frequency of the driving strings is preferably made sufficiently higher than the frequency of oscillation $(f_0)$ of the torsional systems $(A', B')$ so that the strings do not tend to vibrate as separate strings.

The invention system is fundamentally a force system, and not a displacement system, as the proof-masses (25) are restrained from longitudinal displacement, due to acceleration, by the wires attached to them. Whatever proof-mass displacement there is, is due only to actual elongation or contraction of the wires or strings (24).

The inertial assembly hereof, namely the inertial spoked member 20, its torsion shaft 21 and associated strings 24 is arranged to function as an oscillator. When displaced angularly by an external force it continues to oscillate about its axis (19). The frequency of oscillation of the spoked member 20 is controlled by the tension in the strings 24 coupled with the torsion in its torsion member 21. The base tension due to spring 40 is also a factor.

The actual frequency is varied by the acceleration force on the proof-mass (25). The tendency towards longitudinal movement of the mass 25 is restrained by the wires. The force of acceleration is therefore converted to tension in the wires 24, controlling the frequency of oscillation of the torsion member 20. Acceleration of the vehicle in which the transducer unit 15 is mounted, and therefore of its casing 16, is transmitted to the proof-mass (25) through the strings 24. The result is a change of frequency of oscillation of the associated member 20 as aforesaid. Electrical determination of the oscillation frequency at any instant provides precise measurement of the acceleration encountered. This is integrated simply by connecting the frequency to determine the velocity.

Where the proof-mass 25 is replaced by a pressure capsule, changes in tension in the strings 24 due to applied pressure changes to the capsule will result in corresponding frequency change in the oscillations of member 20. Such arrangement is feasible as a manometer for water pressure measurement, or as a gas pressure indicator. By direct application of force to the strings, or through the proof-mass 25, a weighing or force measuring instrument is provided.

Although the present invention has been described in connection with an exemplary embodiment, it is to be understood that modifications and variations in its construction, arrangement and utilization may be made within the broader principles and scope thereof, as set forth in the following claims.

What is claimed is:

1. A transducer of the character described for determining forces applied thereto along a sensing axis, comprising a housing, torsional oscillation means supported in said housing and energized for continuous torsional oscillation about said sensing axis, a mass supported within said housing for response to a force along said sensing axis, and means coupling said mass to said torsional oscillation means to restrain displacement of said mass and to convert said forces into corresponding changes in the frequency of the said torsional oscillations, a second torsional oscillation means supported in coaxial relation with the first of said torsional oscillation means, and a second mass means coupled to said second torsional oscillation means subject to oscillation about the sensing axis.

2. A force transducer of the character described for measuring forces applied thereto along its sensing axis and subject to displacement in response to said forces, comprising a housing, torsional oscillation means supported in said housing and subject to torsional oscillation about said axis, force exerting means mounted co-axially with the torsional oscillation means, means coupling said force exerting means to said torsional oscillation means for translating the applied forces into corresponding changes in frequency of torsional oscillation of said torsional oscillation means, a second torsional oscillation means supported in coaxial relation with the first of said torsional oscillation means and balanced therewith to oscillate at substantially the same predetermined frequency, a second force exerting means coupled to said second torsional oscillation means, and bias spring means connected between both of said force exerting means to establish axial tension in both of said first and second force exerting means.

3. A digital force transducer of the character described for determining forces applied thereto along a single sensing axis, comprising a housing, means supported in said housing and subject to displacement along said axis in response to forces, means energized for torsional oscillation about said sensing axis at a predetermined base frequency, a force responsive means, means coupling said force responsive means to said torsional oscillation means for translating the applied forces into corresponding changes in the frequency of torsional oscillation of said torsional oscillation means, a second torsional oscillation means supported in coaxial relation with the first of said torsional oscillation means in mirror-symmetrical arrangement with respect thereto and balanced therewith to oscillate at substantially the same predetermined frequency, a second force responsive means, means coupling said second torsional oscillation means and second force responsive means, and bias spring means connected between both of said force responsive means to establish axial tension in both of said torsional oscillation means, electrical means responsive to said torsional means to derive the frequency of oscillation of said torsional means for external measurement and second electrical means for said second torsional oscillation means.

4. An accelerometer of the character described for measuring accelerations applied thereto along its sensing axis, comprising a housing, torsional oscillation means supported in said housing and subject to torsional oscillation about said sensing axis at a natural frequency, mass means coupled to said torsional oscillation means for translating the applied forces into corresponding changes supported in coaxial relation with the first of said torsional oscillation means, a second torsional oscillation means supported in coaxial relation with the first of said torsional oscillation means and initially balanced therewith to oscillate at substantially the same predetermined frequency, and a second mass means coupled to said second torsional oscillation means, and electrical means associated with said torsional oscillation means for establishing the oscillation of said torsional oscillation means.

5. An integrating accelerometer of the character described for determining accelerations applied thereto along a single axis, comprising a housing, mechanical means supported in said housing and energized for torsional oscillation about said single axis at a variable natural frequency, a proof-mass mounted in said housing coaxially with the torsional oscillation means, a plurality of tension members coupling the mechanical means to the proof-mass, variations in tension in said tension members being adapted to correspondingly vary the frequency of torsional oscillation of said mechanical means, a second mechanical means supported in coaxial relation with the first said mechanical means in mirror-symmetrical arrangement with respect thereto and initially balanced therewith to oscillate nominally at substantially the same predetermined frequency, a second proof-mass together with further tension members coupled to said second mechanical means, bias spring means connected between said proof-masses to establish axial tension in both of said mechanical means, and electrical means associated with said mechanical means for initiating and maintaining the torsional oscillations thereof, said electrical means being adapted to indicate the frequency of torsional oscillations of said mechanical means, and circuit means for determining the difference in frequency between both of said mechanical means while the integrating accelerometer is subjected to the applied forces, to derive the integrated velocity thereof.

6. An accelerometer of the character described comprising a housing, means supported in said housing and energized for torsional oscillation about an axis at a variable natural frequency, a proof-mass mounted in coaxial array therewith, multiple tension member coupling the proof-mass to the torsional oscillation means, variations in tension in said tension members generated by externally applied accelerations being adapted to be translated into corresponding changes in frequency of said torsional oscillation means, spring means connected to said proof-mass adapted to produce a tension in said tension members, said torsional oscillation means including a torsional member, a torque shaft extending from said housing and mounting said torsional member coaxially with the said axis, and in which said multiple tension members consist of strings individually fastened between said torsional member and said proof-mass and uniformly spaced radially relative to the axis, and electrical means coordinated with said torsional means for initiating and maintaining the torsional oscillations thereof, said electrical means being adapted to indicate the frequency of torsional oscillations of said torsional oscillation means.

7. A digital force transducer of the character described for determining forces applied thereto along a single sensing axis, comprising a housing, means supported in said housing and subject to displacement along said axis in response to force, means energized for torsional oscillation about said sensing axis at a predetermined base frequency, a force responsive means, means coupling said force responsive means to said torsional oscillation means for translating the applied forces into corresponding changes in the frequency of torsional oscillation of said torsional oscillation means, a second torsional oscillation means supported in coaxial relation with the first of said torsional oscillation means, in mirror-symmetrical arrangement with respect thereto and balanced therewith to oscillate at substantially the same predetermined frequency, a second force responsive means coupling said second torsional oscillation means and the second force responsive means, bias spring means connected between both of said force responsive means to establish axial tension in both of said torsional oscillation means and electrical means responsive to said torsional oscillation means to derive the frequency of oscillation of said torsional oscillation means for external measurement and second electrical means for said second torsional means, both said electrical means including conductive strips carried by the associated torsional oscillation means, magnetic means establishing magnetic fields across said strips, and circuit elements interconnecting said conductive strips to establish electromagnetic action therewith.

8. A transducer of the character described for determining forces applied thereto along a sensing axis, comprising a housing, mechanical means supported in said housing and energized for continuous torsional oscillation about said sensing axis, a mass supported within said housing for response to a force along said sensing axis, means coupling said mass to said mechanical means to restrain displacement of said mass and said forces into corresponding changes in the frequency of the said torsional oscillations, the mechanical means including a torsional member coaxial with the said sensing axis, said coupling means comprising a plurality of strings individually fastened between said torsional member and said mass.

9. An accelerometer of the character described for measuring accelerations applied thereto along its sensing axis, comprising a housing, torsional oscillation means supported in said housing and subject to torsional oscillation about said sensing axis at a natural frequency, a mass coupled to said torsional oscillation means for translating the applied forces into corresponding changes in the frequency of torsional oscillation of said torsional oscillation means, the torsional oscillation means including a torsional member, a torque shaft extending from said housing and mounting said torsional member coaxially with the said sensing axis, and a plurality of strings individually fastened between said torsional member and said mass, and electrical means associated with said torsional oscillation means for establishing the oscillation of said torsional oscillation means.

10. An integrating accelerometer of the character described for determining accelerations applied thereto along a single axis, comprising a housing, mechanical means supported in said housing and energized for torsional oscillation about said single axis at a variable natural frequency, a proof-mass mounted in said housing coaxially with the torsional means, a plurality of tension members coupling the mechanical means to the proof-mass, variations in tension in said tension members being adapted to correspondingly vary the frequency of torsional oscillation of said mechanical means, a second mechanical means supported in coaxial relation with the first said mechanical means in mirror-symmetrical arrangement with respect thereto and initially balanced therewith to oscillate nominally at substantially the same predetermined frequency, a second proof-mass together with further tension members coupled to said second mechanical means, bias spring means connected between said proof-masses to establish axial tension in both of said mechanical means, each mechanical means including a torsional member, a torque shaft extending from said housing mounting said torsional members coaxially with said single axis, and a plurality of strings individually fastened between each torsional member and its associated proof-mass and uniformly spaced radially relative to said single axis, electrical means associated with said mechanical means for initiating and maintaining the torsional oscillations thereof, said electrical means being adapted to indicate the frequency of torsional oscillations of said mechanical means, and circuit means for determining the difference in frequency between both of said mechanical means while the integrating accelerometer is subjected to the applied forces, to derive the integrated velocity thereof.

11. A transducer of the character described for determining forces applied thereto along a sensing axis, comprising a housing, mechanical means supported in said housing and energized for continuous torsional oscillation about said sensing axis, a mass supported within said housing for response to a force along said sensing axis, means coupling said mass to said mechanical means to restrain displacement of said mass and to convert said forces into corresponding changes in the frequency of the said torsional oscillations, the mechanical means including a torsional member coaxial with the said sensing axis, and said coupling means comprising a plurality of strings individually fastened between said torsional member and said mass, and cross-acceleration supports mounting said mass means with sole operational displacement capability along the sensing axis direction.

12. An integrating accelerometer of the character described for determining accelerations applied thereto along a single axis, comprising a housing, mechanical means supported in said housing and energized for torsional oscillation about said single axis at a variable natural frequency, a proof-mass mounted in said housing coaxially with the torsional oscillation means, a plurality of tension members coupling the mechanical means to the proof-mass, variations in tension in said tension members being adapted to correspondingly vary the frequency of torsional oscillation of said mechanical means, a second mechanical means supported in coaxial relation with the first said mechanical means in mirror-symmetrical arrangement with respect thereto and initially balanced therewith to oscillate nominally at substantially the same predetermined frequency, a second proof-mass together with further tension members coupled to said second mechanical means, bias spring means connected between said proof-masses to establish axial tension in both of said mechanical means, cross-acceleration supports mounting each proof-mass, and electrical means associated with said mechanical means for initiating and maintaining the torsional oscillations thereof, said electrical means being adapted to indicate the frequency of torsional oscillations of said mechanical means, and circuit means for determining the difference in frequency between both of said mechanical means while the integrating accelerometer is subjected to the applied forces, to derive the integrated velocity thereof.

13. An accelerometer of the character described for measuring accelerations applied thereto along its sensing axis, comprising a housing, torsional oscillation means supported in said housing and subject to torsional oscillation about said sensing axis at a natural frequency, mass means coupled to said torsional oscillation means for translating the applied forces into corresponding changes in the frequency of torsional oscillation of said torsional oscillation means, the torsional oscillation means including a torsional member, a torque shaft extending from said housing and mounting said torsional member coaxially with the said sensing axis, a plurality of strings individually fastened between said torsional member and mass means, and electrical means associated with said torsional oscillation means for establishing the oscillation of said torsional oscillation means, the electrical means including conductive strips carried by said torsional member, magnetic means establishing a magnetic field across said strips and circuit elements interconnecting said conductive strips to establish electromagnetic action therewith.

References Cited in the file of this patent

UNITED STATES PATENTS

| | | |
|---|---|---|
| 2,544,646 | Barnaby et al. | Mar. 31, 1951 |
| 2,815,477 | Dunn et al. | Dec. 3, 1957 |

FOREIGN PATENTS

| | | |
|---|---|---|
| 789,611 | Great Britain | Jan. 22, 1958 |